US012229018B2

(12) United States Patent
Roche et al.

(10) Patent No.: US 12,229,018 B2
(45) Date of Patent: Feb. 18, 2025

(54) RESTRICTED DATA TRANSFER

(71) Applicant: EMC IP Holding Company LLC, Hopkinton, MA (US)

(72) Inventors: Michael Roche, Hamilton (CA); Michal Drozd, Windsor (CA); Scott Quesnelle, Burlington (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 125 days.

(21) Appl. No.: 17/343,531

(22) Filed: Jun. 9, 2021

(65) Prior Publication Data

US 2022/0398167 A1   Dec. 15, 2022

(51) Int. Cl.
*G06F 11/14* (2006.01)
*H04L 9/40* (2022.01)

(52) U.S. Cl.
CPC ...... *G06F 11/1464* (2013.01); *G06F 11/1451* (2013.01); *G06F 11/1469* (2013.01); *H04L 63/102* (2013.01); *H04L 63/107* (2013.01)

(58) Field of Classification Search
CPC ............. G06F 11/1464; G06F 11/1451; G06F 11/1469; H04L 63/102; H04L 63/107
USPC ................................................ 711/154, 164
See application file for complete search history.

(56) References Cited

U.S. PATENT DOCUMENTS

| | | | |
|---|---|---|---|
| 2017/0364302 A1* | 12/2017 | Atherton | G06F 3/0649 |
| 2018/0322297 A1* | 11/2018 | Rodriguez Bravo | G06F 21/10 |
| 2019/0332494 A1* | 10/2019 | Natanzon | G06F 11/1448 |
| 2020/0007579 A1* | 1/2020 | Barday | G06F 21/6245 |
| 2021/0084077 A1* | 3/2021 | Brannon | G06F 21/577 |

* cited by examiner

*Primary Examiner* — Gautam Sain
*Assistant Examiner* — Wei Ma
(74) *Attorney, Agent, or Firm* — Workman Nydegger

(57) ABSTRACT

One example method includes receiving, by a first computing entity from a second computing entity, a request for data, providing, by the first computing entity, a compliance API (Application Program Interface) to the second computing entity, receiving, by the first computing entity from the second computing entity, location information and/or data compliance information, by way of the compliance API, consulting, by the first computing entity, a mapping, and determining, based on information in the mapping and the location information and/or data compliance information, whether or not the data is permitted to be transmitted by the first computing entity to the second computing entity, and either transmitting the data to the second computing entity, or not transmitting the data to the second computing entity, based on data tags, the information in the mapping and the location information and/or data compliance information.

20 Claims, 6 Drawing Sheets

RESTRICTED DATA TRANSFER

FIELD OF THE INVENTION

Embodiments of the present invention generally relate to data management and handling processes. More particularly, at least some embodiments of the invention relate to systems, hardware, software, computer-readable media, and methods for using one or more factors as bases for restricting the transfer of data, such as between entities, and/or between locations, for example.

BACKGROUND

Problems and concerns in this field may be appreciated through the use of a hypothetical example involving a CEO of a company that has offices at various locations around the world. In this example, the company was sued not long ago for failure to comply with one of more of the myriad standards that are in place relating to the handling of data. To ensure that such problems do not occur again in the future, the CEO and board have hired a compliance officer whose sole job is to ensure the compliance of the company with various standards, among others: GDPR (General Data Protection Regulation); CCPA (California Consumer Privacy Act); PIPEDA (Canada—Personal Information Protection and Electronic Documents Act); HIPAA (Health Insurance Portability and Accountability Act); PDPA (Personal Data Protection Act); and, PDPB (Personal Data Protection Bill). There are likely other standards as well with which the company must comply, and the compliance officer is tasked with ensuring company compliance with all of these standards.

In conducting a review of operations at the company however, the compliance officer determined that the current data protection environment of the company lacks adequate, or any, compliance capabilities and enforcement. Thus, there is a need to perform important company operations without running afoul of any of the compliance standards governing the use and handling of data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
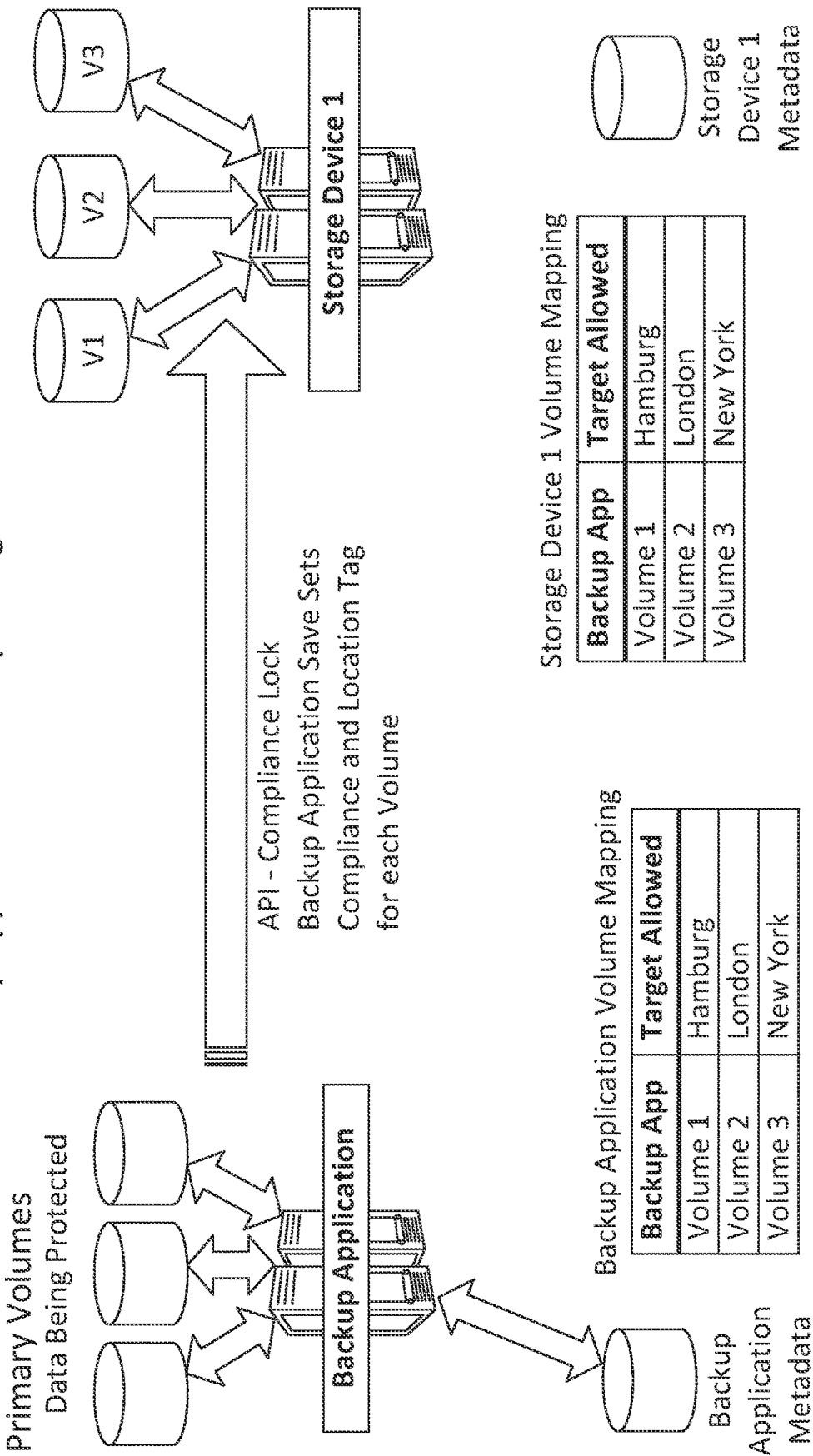
FIG. 1 discloses aspects of a configuration for location-based restricted data transfer between a backup application and a backup storage device.

Embodiments of the present invention generally relate to data management and handling processes. More particularly, at least some embodiments of the invention relate to systems, hardware, software, computer-readable media, and methods for using one or more factors as bases for restricting the transfer of data, such as between entities, and/or between locations, for example.

In general, some example embodiments of the invention provide for data protection systems that may operate to handle data in a way that is compliant with one or more applicable standards. In some embodiments, a backup application may operate to tag data with one or more tags, at a metadata level, so that the tagged data can be identified, and transfer and handling of that data suitably controlled. Tagging may be applied at any level, from an individual data block, to a backup saveset, and all levels in between including, but not limited to, segments and chunks.

As well, a backup application or other computing entity may be able to set a compliance lock, such as at the backup storage level, in conjunction with the use of geo-tagging metadata applied by the backup application or other entity, so that transfer and handling of data may be controlled based on the location of that data. Finally, embodiments of the invention may embrace backup storage devices that may ensure a trust framework of data movement that is controlled by a policy of data movement which, in turn, may built around a policy of allowed locations where the policy is configured to allow for restriction of data transfer between/ among locations that are not allowed. Thus in some embodiments, data may be permitted to be transmitted only to one or more allowed locations, and to no others.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that handling of data, such as the transfer or movement of data for example, may be limited so that data transfer is only permitted, and only possible, between approved geographical locations or sites. An aspect of some embodiments is that data handling, such as the transfer or movement of data for example, may controlled based on requirements imposed by one or more standards. An aspect of some embodiments is that a storage device may implement a compliance lock capability which external applications, such as backup applications, can use.

Note that as used herein, 'data handling' is intended to be broad in scope. Thus, 'data handling' embraces, but is not limited to, any movement of data, any transfer of data, copying data, reading data, writing data, deleting data, and modifying data.

It is noted that embodiments of the invention, whether claimed or not, cannot be performed, practically or otherwise, in the mind of a human. As disclosed herein, embodiments of the invention are applicable to, and find practical usage in, environments in which large numbers, such as millions or billions for example, of metadata tags, and associated data blocks or other pieces of data, may be handled and processed by systems such as data protection systems. Such handling and processing is well beyond the mental capabilities of any human to perform practically, or otherwise. Thus, while simplistic examples may be disclosed herein, those are only for the purpose of illustration and to simplify the discussion. Accordingly, nothing herein should be construed as teaching or suggesting that any aspect of any embodiment of the invention could or would be performed, practically or otherwise, in the mind of a human.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such data protection operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, data segments, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. OVERVIEW AND ASPECTS OF SOME EXAMPLE EMBODIMENTS

As discussed below, example embodiments may be directed to, and resolve, various problems and concerns. It is noted however, that no embodiment is required to implement any particular functionality. Any one or more of the functionalities discussed below may be combined in any way in any embodiment, although no particular function, or combination of functions, is required in any particular embodiment.

B.1

One problem that may be addressed by one or more embodiments is that a typical backup application may not have a mechanism for identifying that the data that is being backed up needs to be classified as being governed by a compliance standard. This means that the data, once compartmentalized in the backup application form, does not have a tag that indicates the source, such as a database or filesystem for example, that contained data governed by one or more standards. This may lead to a reporting problem in that the company has no way of indicating what backup data may be governed by a compliance standard. Thus, there may be a need to ensure that each compartmentalized block of data is tagged with one or more compliance tags, where each tag may correspond to a particular data governance standard. To illustrate, a company may have a European data center that is covered by the EU GDPR, and a medical division of the company may be covered by HIPAA. In this example case, an embodiment of the invention may provide for tagging a data block both with a 'GDPR' tag and a 'HIPAA' tag.

Stated more generally, a backup application within the scope of the invention may operate to tag its data with one or more applicable tags. In the case, for example, of DellEMC NetWorker, a metadata tag may be associated with each saveset generated by the NetWorker server. As discussed below, a saveset may be employed, in some embodiments, as a way to indicate, for example, the saveset holds personal data, designation of standards that apply to the data in the saveset, and geographical tagging that applies to data in the saveset. This approach may enable selective implementation of one or more restrictions on the way the data in the saveset is handled.

B.2

In some cases, example embodiments may involve more than tagging data at the saveset level. The backup application may be storing its backup data on a storage device. The storage device may have no concept or awareness of the need for data to be compliant with standards, and therefore cannot support compliance. This circumstance may become problematic as backup data is replicated across data centers and, in some cases, across geographical spaces to multiple different geographical locations.

Data replicated across geographical spaces to different geographical locations may be a problem if it means that the target data center is outside of the jurisdiction of a standard under which the source data center resides. This circumstance might arise for example, when data is replicated from a German data center to a data center in Great Britain. As of 1 Jan. 2021, the Great Britain data center is no longer in the GDPR compliance area. This means that GDPR data cannot be replicated outside of the EU, that is, from Germany to Great Britain. The problem in this case may be that the storage device may not understand that there are applicable compliance requirements that must be met, and the backup application may need a mechanism to identify data that is governed by one or more compliance standards.

To address considerations such as those just noted, a backup device may provide an API to a backup application that allows the backup application to set a retention lock that prevents the backup data from being deleted. This retention lock may also have a time limit set so that once the time expires, the backup data can be deleted. The data storage device may provide a similar mechanism, such as an API (Application Program Interface) for example, so that when the saveset backup data is being placed on the storage device, the backup application can indicate that this block of backup data is governed by a compliance standard. This API provided by the storage device may also allow the backup application to compliance lock the data. This compliance lock may not prevent the deletion of data, and the compliance lock may still be subject to other expiration models. However, the compliance lock may prevent any request to copy or replicate, the data, or otherwise handle the data in a way that is prohibited by one or more compliance standards.

B.3

As noted, the problems mentioned above may be resolved, in whole or in part, through the use of backup application tagging of data, and using a storage device compliance lock API. However, there may still be a need, in some cases, to be able to prevent the movement of data from one entity to another entity, such as from one storage device to another storage device. To this end, embodiments of the invention may provide a mechanism by which a compliance lock will be recognized and honored by a storage device when the storage device wants to replicate data to another storage device, or when a storage device is requested to replicate data. In some embodiments, this may be accomplished through the use of an additional tag.

Particularly, an additional tag may be added to a compliance lock indicating the geography, that is, a geographical location, from which the backup data was generated, and the compliance lock was set from. By providing a location metadata to a compliance lock, a backup storage device may have some ability to enforce replication requests. One aspect of this geographical setting is that it may be independent of the compliance standard, and may be a geo located tag. That is, even if a compliance standard is applicable, and met, it may still be the case that data governed by the compliance standard will not be permitted by the location metadata to be transmitted between different geographical locations.

B.4

Embodiments of the invention may also provide for various enforcement mechanisms. For example, embodiments may provide a mechanism which the backup storage device may use to determine whether a requested data replication process will be performed or not. In some embodiments, this may be accomplished by a backup storage devices having an API that a first storage device can use to interrogate a second storage device on a compliance policy of the second storage device. An example of such an API may be as follows:

(1) Backup device 1 is configured to replicate data to backup device 2;

(2) Backup device 1 asks Backup Device 2 for its certified location;

(3) Backup device 2 passes back its certified location to Backup device 1;

(4) Backup device 1 reviews its table of allowed locations and determines if it is permitted to replicate data to the location where Backup device 2 is located; and (5) If such replication is permitted, Backup device 1 replicates the requested data to Backup device 2, otherwise, no replication is performed.

By implementing this API in conjunction with one or more of the functionalities noted above (such as metadata tagging, retention locks, geo located tags, and, API for enforcement), embodiments may provide an ability to restrict transfer of data that is governed by one or more compliance standards.

B.5

In more detail, the question becomes, how copying of the data can be prevented. The solution provided by some example embodiments is that the source device may be configured to trust no other device that does not honor the API provided by the source device, and the source device may not allow data movement outside of itself to any untrusted device.

At present, conventional approaches to data handling do not provide a customer with a direct mechanism to restrict the transfer of data, whether for compliance reasons or for organizational reasons. Rather, conventional approaches may take a complex and cumbersome approach to data handling, while example embodiments of the invention may serve to ensure that the day to day backup environment has a set of safeguards in place to automatically prevent unauthorized movement of data.

B.6

In brief then, some example embodiments may include one or more features that may resolve various problems with conventional approaches. To illustrate, backup application tagging at the metadata level may solve a reporting problem by identifying data that may be subject to various compliance, and other, standards. As well, backup application tagging at the metadata level may provide a mechanism for identifying and restricting data. Further, backup applications capable of setting a compliance lock at the backup storage level may solve a compliance lock problem. Further, the ability of a backup application to set a compliance lock in conjunction with a geo-tagging metadata may solve a compliance lock location problem. Finally, backup storage devices ensuring a trust framework of data movement that is controlled by a policy of data movement built around a policy of allowed locations may allow for restrictions on data transfer.

With these considerations in view, example embodiments of the invention may also provide an overall framework that enables various functionalities. For example, such a framework, which may be implemented in such a way that it is trusted by one or more customers, may enable: backup applications to define and implement an exclusion/inclusion list for restricted data transfer; storage devices to implement a compliance lock API; a storage device to define and implement an exclusion/inclusion list for restricted data transfer; and, storage devices to establish a trust model that will validate that a storage device can be trusted and that it will adhere to an exclusion/inclusion list for restricted data transfer.

C. EXAMPLE USE CASES

With attention now to FIGS. 1-4, details are provided concerning some example use cases involving example embodiments of the invention. In general, the Figures provide a detailed overview of scenarios involving compliance and location based restricted data transfers. Restricted data transfers may exist between location based restrictions and compliance based restrictions. It is noted that backup applications and storage devices may have to have compliance/location awareness and support for a trust relationship among themselves so that restrictions concerning data handling may be enforced. Absent such a trust relationship, it may not be possible to enforce restrictions concerning data handling operations. Finally, some embodiments of the invention may require an API framework to be established to allow all parts of the data stack to enforce the data handling requirements.

C.1—Use Case No. 1

With reference to the example of FIG. 1, a use case is indicated in which a restriction is imposed on data transfer between geographical locations, particularly, between a BackupApplication at a first location and a backup storage device, StorageDevice1, at a second location. As shown, the BackupApplication may be associated with a set of Primary Volumes that hold data that is being protected, and the StorageDevice1 may also be associated with a set of volumes V1, V2, and V3. Each of the Primary Volumes may hold data, such as data blocks for example, which has been tagged with one or more compliance tags and/or one or more location tags. The location tags may restrict the transmission of Primary Volume data to specified targets, and the compliance tags may specify how the tagged data must be handled. For example, HIPAA data may only be accessible to verified medical professionals. Further, a compliance lock API may be made available to the BackupApplication by the StorageDevice1 that the BackupApplication can use to indicate to the StorageDevice1 that particular data of a saveset transmitted by the BackupApplication is governed by one or more compliance standards. The API may allow the BackupApplication to compliance lock data in the saveset.

As shown, the BackupApplication may communicate with a database that holds BackupApplication metadata such as compliance tags and location tags for example, and the StorageDevice1 may communicate with a database that holds StorageDevice1 metadata. A BackupApplication volume mapping may be provided that maps one or more of the Primary Volumes to a geographical location to which data transmission by the BackupApplication is permitted. Similarly, a StorageDevice1 volume mapping may be provided that maps one or more targets, that is, one or more of the volumes V1, V2, and V3, to a geographical location which is permitted to receive data transmitted by the BackupApplication. Thus, in the example of FIG. 1, the BackupApplication volume mapping indicates that data from a Primary Volume 1 may be transmitted by the BackupApplication to a volume in Hamburg, and the StorageDevice1 volume mapping indicates that Volume 1 in Hamburg is an authorized target for data from Primary Volume 1. Thus, for example, saveset data from Primary Volume 1 at the BackupApplication side may be tagged with a 'Hamburg' location tag which the StorageDevice1 can use, in conjunction with the StorageDevice1 volume mapping, to determine where that saveset data should be stored. If the BackupApplication attempts to send data from Primary Volume 1 to London rather than Hamburg, the StorageDevice1 volume mapping would be used by the StorageDevice1 to prevent that result.

In the example scenario of FIG. 1, the BackupApplication has a trusted storage device in StorageDevice1 and is operable to transmit BackupApplication savesets to the StorageDevice1. The StorageDevice1 presents 3 volumes to the BackupApplication with each volume designated to a specific geographical location. The BackupApplication maintains a mapping of the location to volume internally within its metadata. As well, the BackupApplication may set a compliance lock for each volume and generates savesets for each volume based on its internal policies for location.

Note that the BackupApplication and StorageDevice1 may have a trust relationship with each other. Absent such a trust relationship, any requests from either side, that is, the BackupApplication or the StorageDevice1, may result in the rejection of all data transfer requests.

C.2—Use Case No. 2

Figure 2:
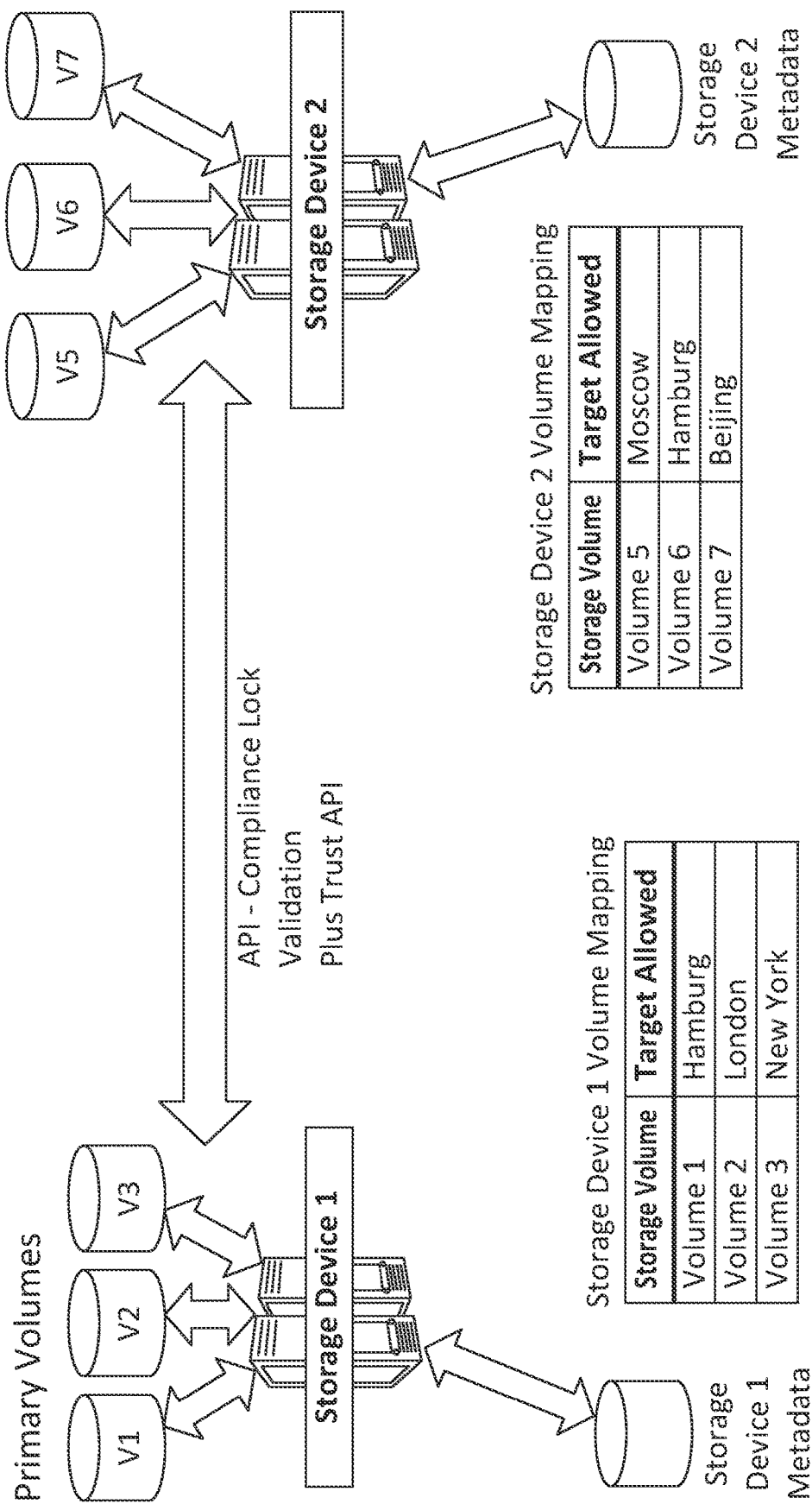
FIG. 2 discloses aspects of a configuration for location-based restricted data transfer between a first storage device and a second storage device.

With reference to the example of FIG. 2, a use case is indicated in which data may be transferred between two storage entities, such as StorageDevice1 and StorageDevice2, and one or more restrictions may be imposed as to the geographical location(s) to which data may be transmitted. In the example of FIG. 2, StorageDevice1 has a trusted relationship established with StorageDevice2. The trusted relationships disclosed herein may be established by any suitable method and/or mechanism, such as an authentication process for example in which one of the devices authenticates the other.

In the particular example of FIG. 2, the StorageDevice1 contains 3 volumes V1, V2, and V3, with each volume mapped to a specific geographical location, as shown in the StoradeDevice1 Volume Mapping. The StorageDevice1 may maintain a mapping of geographical locations to volumes internally within its metadata, that is, this mapping information may be maintained in the StorageDevice1 Metadata.

The StorageDevice2 contains 3 volumes V5, V6, and V7, with each volume mapped to a specific geographical location. The StorageDevice2 may maintain a mapping of the geographical locations to volumes V5, V6, and V7, internally within its metadata, that is, this mapping information may be maintained in the StorageDevice2 Metadata.

Note that StorageDevice1 and StorageDevice2 may have a trust relationship with each other, and also with a BackupApplication (not shown in FIG. 2). Any or all of these trust relationships may be established by way of a TrustAPI. As well, one or both of the StorageDevice1 and StorageDevice2 may set a compliance lock for its respective volumes and may transmit, or not, savesets from those volumes based on requirements specified in the respective compliance lock.

With continued attention to the example use case of FIG. 2, it was noted above that the two backup storage devices, StorageDevice1 and StorageDevice2, both have volume location mappings. As shown however, these two mappings are not 100% matches. Particularly, only one of the targets, Hamburg, in the StorageDevice1 volume (Volume 1) mapping also appears in the StorageDevice2 volume mapping (Volume 6). That is, the only data replication that can take place is between volume V1 of StorageDevice1 and volume V6 of StorageDevice2 as these two volumes are both designated to Hamburg.

If a replication of volume data is requested from one of StorageDevice1 or StorageDevice2 to the other of StorageDevice1 or StorageDevice2, the compliance validation API may interchange between the two devices, depending upon the direction of data flow. That is, for example, if replication of volume data from StorageDevice2 to StorageDevice1 is requested, and the two storage devices are in different respective geographical locations, the compliance validation API would be provided by StorageDevice2, and the data only replicated to StorageDevice1 if StorageDevice2 determines, such as by consulting the StorageDevice2 volume mapping, and by receiving certified location information from the StorageDevice1, that it is permitted to replicate data from its location to the location of StorageDevice1.

A request for replication of data between the other two volumes, that is, two of London, New York, Moscow, and Beijing, would be rejected. The interchange of the compliance API would result in neither storage device satisfying its compliance. Finally, the two devices may be in a trust relationship with each other that was established prior to the replication request. A device that is not in a trust relationship with the other device involved, or potentially involved, with a data transfer transaction may have all data transfer requests rejected.

C.3—Use Case No. 3

Figure 3:
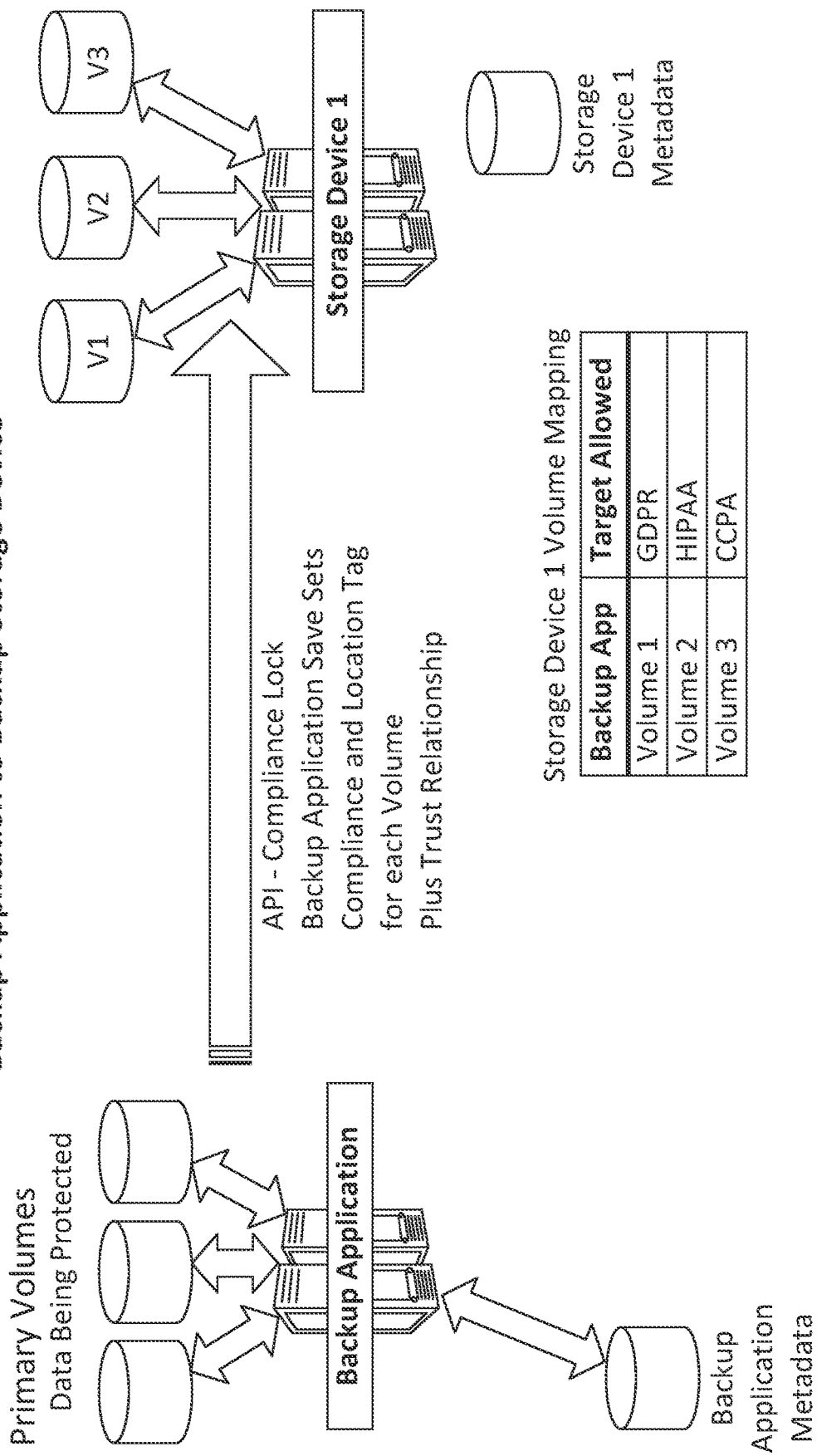
FIG. 3 discloses aspects of a configuration for compliance-based restricted data transfer between a backup application and a storage device.

With reference to the example of FIG. 3, a use case is indicated in which data may be transferred between a backup application, such as the BackupApplication and a storage device, such as StorageDevice1, and one or more restrictions may be imposed ono the data transfer by one or more data compliance standards, such as GDPR, HIPAA, and/or, CCPA. In the example of FIG. 3, the BackupApplication has a trust relationship with a storage device, such as StorageDevice1.

In this illustrative example, StorageDevice1 presents 3 volumes, V1, V2, and V3, to BackupApplication with each volume designated to a specific compliance standard, but not a location, in this example. Particularly, volume V1 is designated for GDPR, volume V2 is designated for HIPAA, and volume V3 is designated for CCPA. BackupApplication may maintain a mapping of the compliance standard to volume internally within its BackupApplication metadata.

The BackupApplication may set a compliance lock, using a compliance API provided by StorageDevice1, for each primary volume of the BackupApplication, and may generate savesets for each primary volume based on the BackupApplication internal policies for compliance. That is, the compliance API may enable the BackupApplication to compliance lock the data of the savesets. In this way, the BackupApplication is able to indicate, to StorageDevice1, that the data of one or more of the savesets generated by the BackupApplication is governed by one or more data compliance standards.

Finally, the BackupApplication and the StorageDevice1 may be in a trust relationship with each other that was established prior to the replication request. A device or application that is not in a trust relationship with the other device or application involved, or potentially involved, with a data transfer transaction may have all data transfer requests rejected.

C.4—Use Case No. 4

Figure 4:
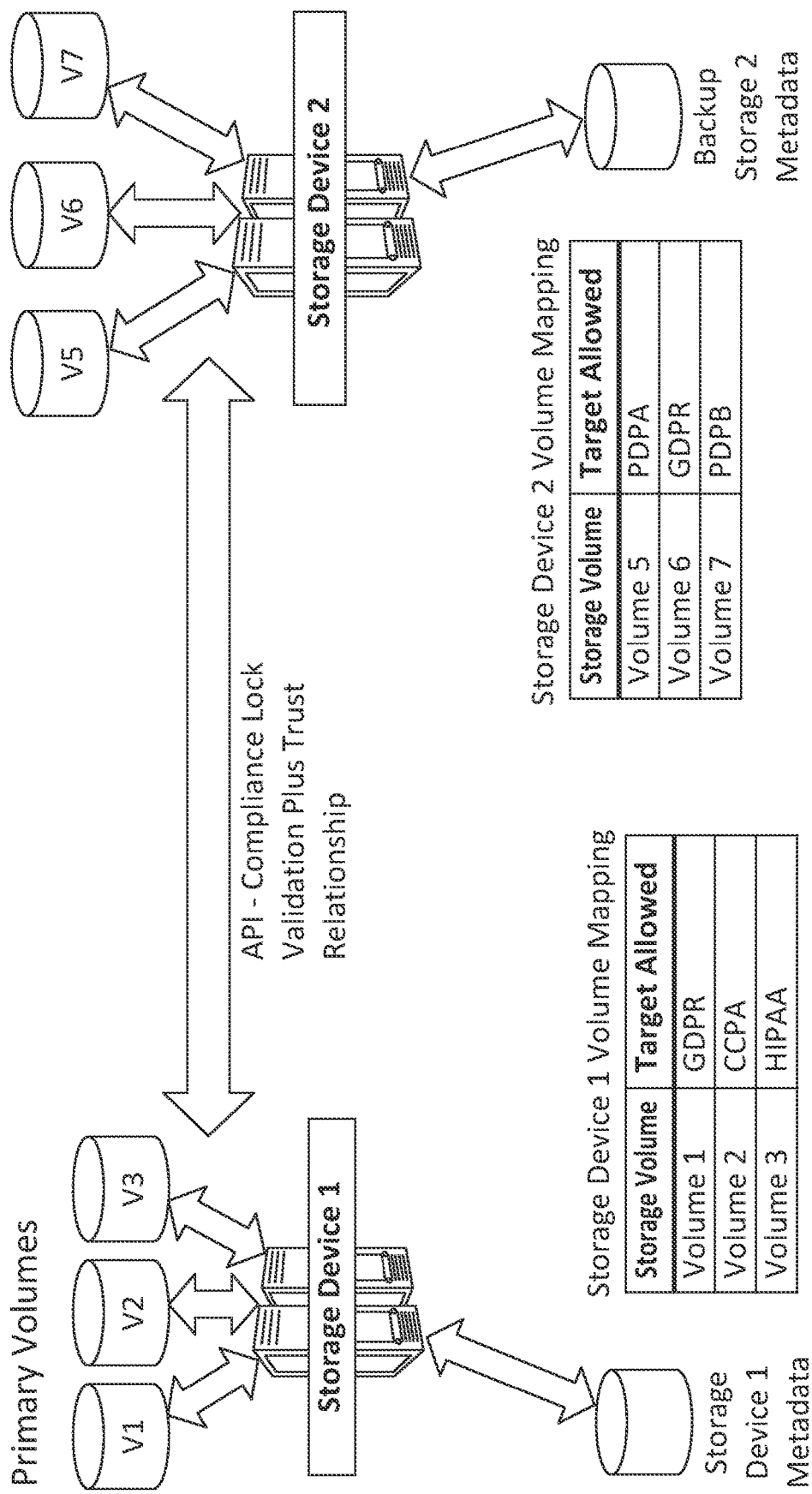
FIG. 4 discloses aspects of a configuration for compliance-based restricted data transfer between a first storage device and a second storage device.

With reference next to the example of FIG. 4 a use case is indicated in which data may be transferred between storage devices using a compliance lock. In the example of FIG. 4, the StorageDevice1 has a trusted relationship established with StorageDevice2.

As shown, the example StorageDevice1 contains 3 volumes, with each volume designated to a specific compliance standard thus, V1 (GDPR), V2 (CCPA), and V3 (HIPAA). The StorageDevice1 may maintain a mapping of the compliance standard to volume internally within its StorageDevice1 metadata, as shown. As well, the example StorageDevice2 contains 3 volumes, with each volume designated to a specific compliance standard thus, V6 (GDPR), V7 (PDPB), and V5 (PDPA). The StorageDevice2 may maintain a mapping of the compliance standard to volume internally within the StorageDevice2 metadata. As in the example of Use Case No. 3, the storage device to which the data is requested to be transferred may supply a compliance API that the transferring device may use to set a compliance lock, or compliance locks, on particular datasets residing at the transferring device.

Finally, the StorageDevice2 and the StorageDevice1 may be in a trust relationship with each other that was established prior to a data replication request or data transfer request. A device or application that is not in a trust relationship with the other device or application involved, or potentially involved, with a data transfer transaction may have all data transfer requests rejected.

With continued reference to FIG. 4, the disclosed configuration may be employed in connection with data transfer, and/or replication, between storage devices based on location enforcement. As shown, the two storage devices both have volume location mappings, namely, StorageDevice1 Volume Mapping and StorageDevice2 Volume Mapping. However, these two maps do not match up with each other exactly. Thus, if a replication of volume data is requested from one of StorageDevice1 and StorageDevice2 to the other of StorageDevice1 and StorageDevice2, then the compliance validation API would interchange between the two devices. That is, the compliance validation API would be provided by whichever device has been requested to transfer data, that is, the data transferring device.

In the example of FIG. 4, the only data replication that can take place is between Volume 1 of StorageDevice1 and Volume 6 of StorageDevice2, as these two volumes are both designated to GDPR. A request for replication of data between any other combination of StorageDevice1 and StorageDevice2 volumes would be rejected. The interchange of the compliance API between the devices would result in neither device meeting the compliance requirements.

D. EXAMPLE METHODS

Figure 5:
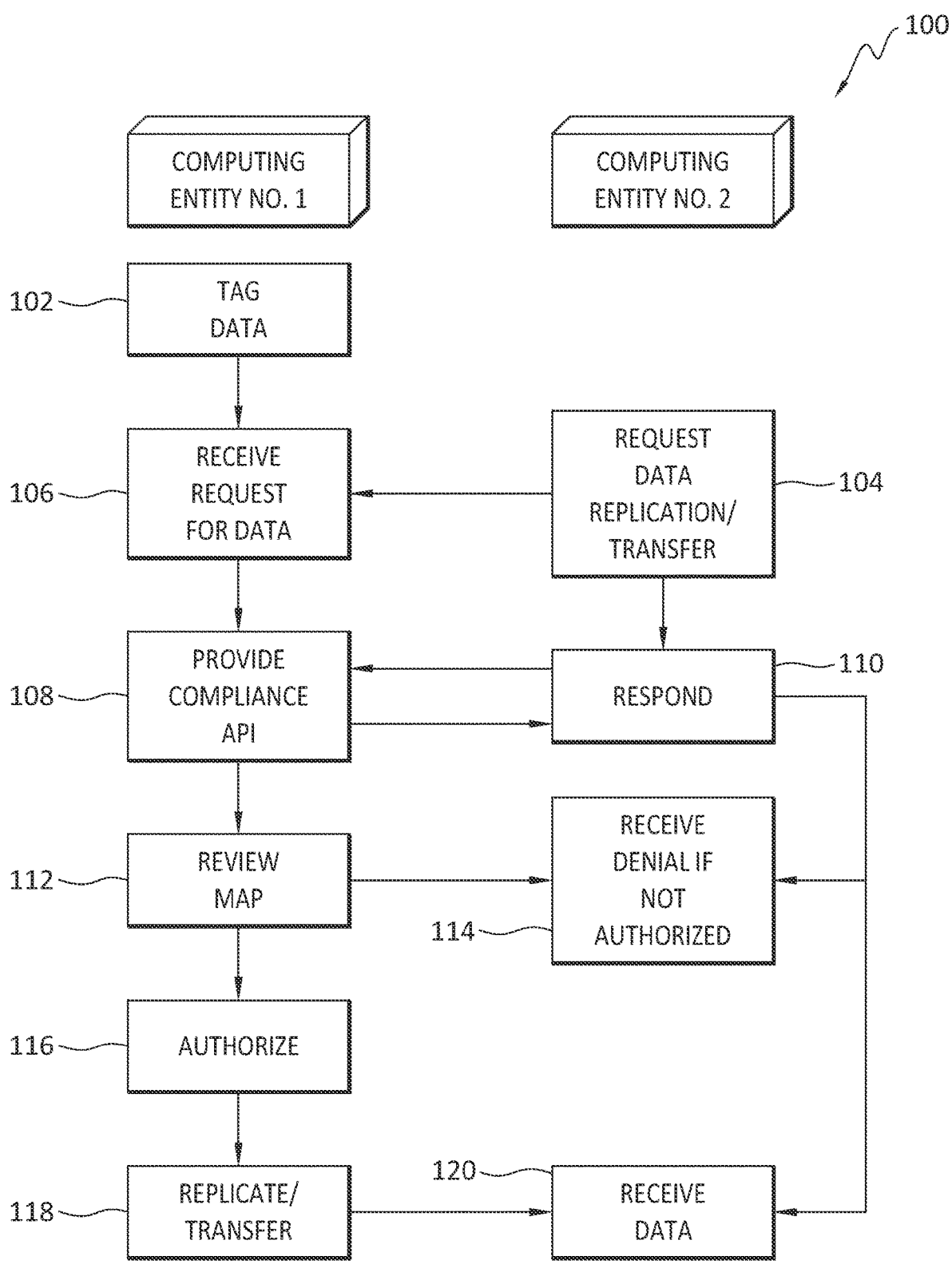
FIG. 5 discloses aspects of an example method.

It is noted with respect to the example method of FIG. 5 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 5, an example method 100 is disclosed for controlling data transfer and/or replication between computing entities. As used herein, a 'computing entity' is intended to be broadly construed and embraces, but is not limited to, software, hardware, and combinations of hardware and software. Thus, examples of computing entities include, but are not limited to, backup applications, and storage systems and devices. In some embodiments, the example method 100 may be performed by a group of computing entities, while in other embodiments, the entire method 100 may be performed by a single computing entity. More generally however, the functional allocation indicated in FIG. 5 is presented by way of example only, and is not intended to limit the scope of the invention in any way.

The method 100 may begin when a Computing Entity No. 1 tags data 102. The tags applied to the data may comprise one or more tags, such as metadata tags for example, and may comprise, for example, a geo tag indicating one or more permissible geographical locations to which the data can be sent, and one or more compliance tags each identifying a respective data compliance standard that governs the handling of the data. Additional, or alternative, tags may be applied 102 to the data. The tags may be applied 102 to as little data as a single data block, or to an entire saveset. In some embodiments, a tag may be applied to the individual elements of a dataset, such as each data block in a dataset, and in other embodiments, a tag may be applied to the entire dataset rather than to each of the individual elements of the dataset.

At some point, a Computing Entity No. 2 may request 104 replication of the Computing Entity No. 1 data to itself, that is, to the Computing Entity No. 2. The Computing Entity No. 1 may receive 106 the request from the Computing Entity No. 2 and may, in response to receipt of that request, provide a compliance API 108 to the Computing Entity No. 2. The Computing Entity No. 2 may response 110 to the compliance API by providing information confirming, for example, that Computing Entity No. 2 is in a geographical location to which data from Computing Entity No. 1 is permitted to be transferred, and/or information confirming that Computing Entity No. 2 has one or more volumes designated for compliance tagged data of Computing Entity No. 1. More generally, the response 110 may comprise any information needed by Computing Entity No. 1 to determine whether or not data will be sent to Computing Entity No. 2.

After receipt of the response 110, the Computing Entity No. 1 may review a map 112 to determine whether or not the requested data is permitted to be sent to the Computing Entity No. 2. For example, the mapping may indicate which geographical location(s) the Computing Entity No. 1 data may be sent to, and/or may indicate which volumes, if any, of Computing Entity No. 2 are authorized to receive data that is governed by one or more data compliance standards. If the mapping indicates that the data transmission to Computing Entity No. 2 is not authorized, the Computing Entity No. 2 may receive a denial indicator 114 from the Computing Entity No. 1.

On the other hand, if the mapping indicates that the data transmission to Computing Entity No. 2 is authorized because Computing Entity No. 2 is in an authorized location and/or a volume of Computing Entity No. 2 is authorized to receive data governed by a specified data compliance standard, the Computing Entity No. 1 may then authorize 116, and perform 118, the transmission of the data to the Computing Entity No. 2. The transmission 118 of the data may comprise the transfer of data from the Computing Entity No. 1 to the Computing Entity No. 2, and/or the replication of data at Computing Entity No. 1 to the Computing Entity No. 2. In either case, the data transmitted 118 from Computing Entity No. 1 may then be received 120 by Computing Entity No. 2.

E. FURTHER EXAMPLE EMBODIMENTS

Following are some further example embodiments of the invention. These are presented only by way of example and are not intended to limit the scope of the invention in any way.

Embodiment 1. A method, comprising: receiving, by a first computing entity from a second computing entity, a request for data; providing, by the first computing entity, a compliance API (Application Program Interface) to the second computing entity; receiving, by the first computing entity from the second computing entity, location information and/or data compliance information, by way of the compliance API; consulting, by the first computing entity, a mapping, and determining, based on information in the mapping and the location information and/or data compliance information, whether or not the data is permitted to be transmitted by the first computing entity to the second computing entity; and either: transmitting the data to the second computing entity when the information in the mapping and the location information and/or data compliance information indicating that the transmitting is permitted; or preventing transmission of the data to the second computing entity when the information in the mapping and the location information and/or data compliance information indicating that the transmitting is not permitted.

Embodiment 2. The method as recited in embodiment 1 wherein transmitting the data comprises transferring the data, or replicating the data.

Embodiment 3. The method as recited in any of embodiments 1-2, wherein the data is tagged with a geo tag and/or a compliance tag.

Embodiment 4. The method as recited in embodiment 3, wherein the geo tag indicates a geographical location to which the data is permitted to be transmitted, and the compliance tag indicates a data compliance standard that governs handling of the data.

Embodiment 5. The method as recited in any of embodiments 1-4, wherein one of the computing entities is a data storage entity.

Embodiment 6. The method as recited in any of embodiments 1-5, wherein one of the computing entities is a backup application.

Embodiment 7. The method as recited in any of embodiments 1-6, wherein the first computing entity and the second computing entity have a trust relationship with each other.

Embodiment 8. The method as recited in any of embodiments 1-7, wherein the second computing entity comprises a mapping that relates a volume of the second computing entity to a particular geographical location and/or to a particular data compliance standard.

Embodiment 9. The method as recited in any of embodiments 1-8, wherein the mapping consulted by the first computing entity relates a volume of the first computing entity to a particular geographical location and/or to a particular data compliance standard.

Embodiment 10. The method as recited in any of embodiments 1-9, wherein the data comprises a saveset created by a backup application.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
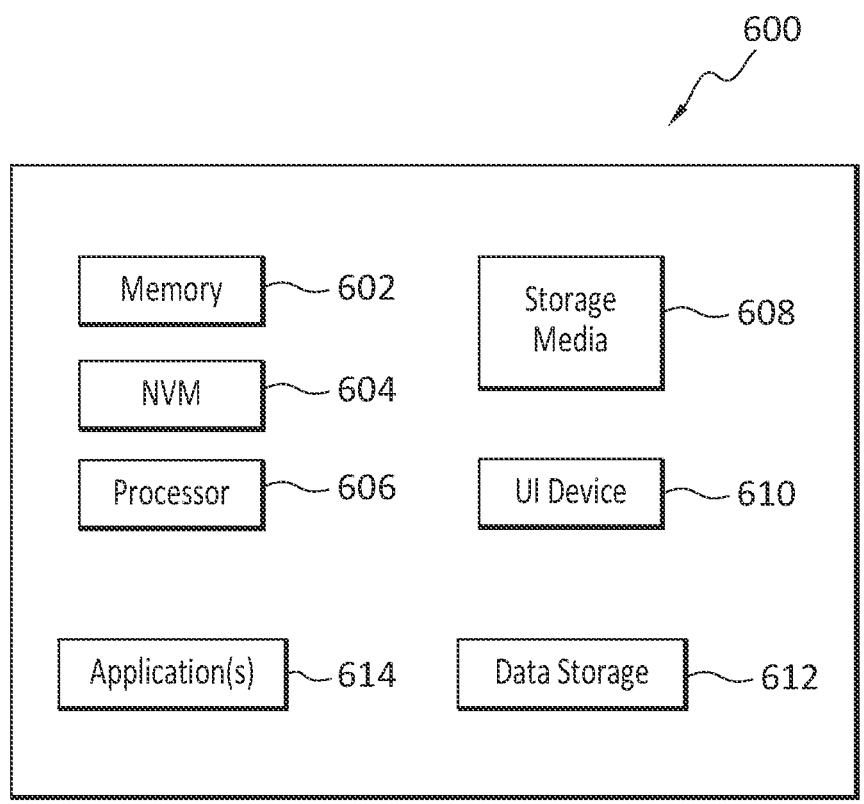
FIG. 6 discloses aspects of an example computing entity operable to perform any of the disclosed methods and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a backup application, said method comprising:
    setting a compliance lock for a primary volume of the backup application, wherein the compliance lock is set using a compliance API (Application program interface) provided by a storage device, and wherein the compliance lock prevents requests to copy or replicate the primary volume;
    adding an additional tag to the compliance lock;
    receiving, from the storage device, a request for data controlled by the backup application;
    providing access to the compliance API to the storage device;
    receiving from the storage device, location information and/or data compliance information by way of the compliance API;
    consulting a mapping and determining, based on information in the mapping and the data compliance information, whether or not the data is permitted to be transmitted by the backup application to the storage device;
    when the data compliance information and the additional tag both indicate that transmission of the data is permitted, transmitting the data to the storage device; and
    when the data compliance information indicates the transmission of the data is permitted but the additional tag indicates the transmission of the data is not permitted, preventing the transmission of the data to the storage device such that the additional tag is independently evaluated relative to the data compliance information and such that the transmission of the data occurs when both the data compliance information and the additional tag indicate the transmission of the data is permitted.

2. The method as recited in claim 1 wherein transmitting the data comprises transferring the data, or replicating the data.

3. The method as recited in claim 1, wherein the data is tagged with a geo tag and/or a compliance tag.

4. The method as recited in claim 3, wherein the geo tag indicates a geographical location to which the data is permitted to be transmitted, and the compliance tag indicates a data compliance standard that governs handling of the data.

5. The method as recited in claim 1, wherein the backup application and the storage device have a trust relationship with each other.

6. The method as recited in claim 1, wherein the storage device comprises a mapping that relates a volume of the storage device to a particular geographical location and/or to a particular data compliance standard.

7. The method as recited in claim 1, wherein the mapping consulted by the backup application relates the primary volume of the backup application to a particular geographical location and/or to a particular data compliance standard.

8. The method as recited in claim 1, wherein the data comprises a saveset created by a backup application.

9. The method as recited in claim 1, wherein the additional tag indicates a geographical location, from which backup data was generated.

10. The method as recited in claim 1, wherein the additional tag is independent of a data compliance standard that governs handling of the data.

11. A non-transitory computer readable storage medium having stored therein instructions that are executable by one or more hardware processors to cause a backup application to perform operations comprising:
    setting a compliance lock for a primary volume of the backup application, wherein the compliance lock is set using a compliance API (Application program interface) provided by a storage device, and wherein the compliance lock prevents requests to copy or replicate the primary volume;
    adding an additional tag to the compliance lock;
    receiving, from the storage device, a request for data controlled by the backup application;
    providing access to the compliance API to the storage device;
    receiving, from the storage device, data compliance information by way of the compliance API;
    consulting a mapping and determining, based on information in the mapping and the data compliance information, whether or not the data is permitted to be transmitted by the backup application to the storage device;
    when the data compliance information and the additional tag both indicate that transmission of the data is permitted, transmitting the data to the storage device; and when the data compliance information indicates the transmission of the data is permitted but the additional tag indicates the transmission of the data is not permitted, preventing the transmission of the data to the storage device such that the additional tag is independently evaluated relative to the data compliance information and such that the transmission of the data occurs when both the data compliance information and the additional tag indicate the transmission of the data is permitted.

12. The non-transitory computer readable storage medium as recited in claim 11 wherein transmitting the data comprises transferring the data, or replicating the data.

13. The non-transitory computer readable storage medium as recited in claim 11, wherein the data is tagged with a geo tag and/or a compliance tag.

14. The non-transitory computer readable storage medium as recited in claim 13, wherein the geo tag indicates a geographical location to which the data is permitted to be transmitted, and the compliance tag indicates a data compliance standard that governs handling of the data.

15. The non-transitory computer readable storage medium as recited in claim 11, wherein the backup application and the storage device have a trust relationship with each other.

16. The non-transitory computer readable storage medium as recited in claim 11, wherein the storage device comprises a mapping that relates a volume of the storage device to a particular geographical location and/or to a particular data compliance standard.

17. The non-transitory computer readable storage medium as recited in claim 11, wherein the mapping consulted by the backup application relates the primary volume of the backup application to a particular geographical location and/or to a particular data compliance standard.

18. The non-transitory computer readable storage medium as recited in claim 11, wherein the data comprises a saveset created by a backup application.

19. The non-transitory computer readable storage medium as recited in claim 11, wherein the additional tag indicates a geographical location, from which backup data was generated.

20. The non-transitory computer readable storage medium as recited in claim 11, wherein the additional tag is independent of a data compliance standard that governs handling of the data.

* * * * *